United States Patent [19]

Rembold et al.

[11] 4,244,244
[45] Jan. 13, 1981

[54] METHOD AND APPARATUS FOR ELIMINATING GEAR SHIFTING JOLT IN MOTOR VEHICLES

[75] Inventors: Helmut Rembold, Möglingen; Ernst Linder, Mühlacker, both of Fed. Rep. of Germany

[73] Assignee: Robert Bosch GmbH, Stuttgart, Fed. Rep. of Germany

[21] Appl. No.: 867,307

[22] Filed: Jan. 6, 1978

[30] Foreign Application Priority Data

Jan. 11, 1977 [DE] Fed. Rep. of Germany ....... 2700821

[51] Int. Cl.$^3$ ............................................. B60K 41/22
[52] U.S. Cl. ..................................... 74/866; 74/752 D
[58] Field of Search ....................... 74/865, 866, 752 D

[56] References Cited

U.S. PATENT DOCUMENTS

| | | | |
|---|---|---|---|
| 3,719,096 | 3/1973 | Sprague et al. | 74/866 X |
| 3,752,011 | 8/1973 | Casey et al. | 74/866 X |
| 3,754,482 | 8/1973 | Sanders et al. | 74/752 D X |
| 3,942,393 | 3/1976 | Forster et al. | 74/866 |

Primary Examiner—Rodney H. Bonck
Attorney, Agent, or Firm—Frishauf, Holtz, Goodman & Woodward

[57] ABSTRACT

A completely electronic circuit operating from the respective outputs of a motor speed transducer and a transmission input speed transducer and from other inputs which are usually constant voltages calculates a control signal for moving the control member of an automatic clutch for coupling a vehicle motor to a vehicle transmission during slipping engagement of the clutch until gripping engagement is made in such a way as to minimize the jolt effect without the necessity of hydraulic or mechanical damping devices.

16 Claims, 6 Drawing Figures

METHOD AND APPARATUS FOR ELIMINATING GEAR SHIFTING JOLT IN MOTOR VEHICLES

This invention concerns the elimination of jolts in automatic or semiautomatic gear shifting in a motor vehicle in which the transmission is electronically controlled. More particularly, it concerns the control of automatic clutching between motor and transmission in an economical and effective manner where the transmission is a stepwise operating transmission.

BACKGROUND AND PRIOR ART

German published patent application (OS) No. 2 124 024 shows a system for regulation or control of shift members of an automatic stepwise transmission of a motor vehicle in which a friction clutch between motor and the portion of the transmission that turns with the vehicle wheels has its engagement controlled with reference to a predetermined change of motor speed with respect to time. This predetermined amount of motor speed change is determined as a quantity that depends on the motor speed value, the motor torque, the direction of shift, the selected gear, the transmission oil temperature and the loading condition of the vehicle.

The value of permissible jolt and the actual value of jolt effect thus calculated by the time derivative of motor speed are supplied to a control circuit the output amplifier of which drives a mechanical control of a pressure controller for actuation of a friction clutch. The peak values of torque and of the oil pressure in the pressure control that occur during the shifting operation are diminished by the provision of delay devices, for example RC circuits in the electronic equipment or oil nozzles in the hydraulic equipment. A disadvantage of this known system is that the actual amount of jolt effect is only imperfectly determined, and the jolt that takes place after the engagement of the friction plates of the clutch, that is caused by the stiffness of the mechanical drive connection to the wheels, is not taken account of.

It is an object of the present invention to provide a more effective calculation of the potential jolt effect, so that the proper time for the engagement of a friction clutch in automatic or semiautomatic gear shifting can be more effectively determined without producing jolts not taken account of in the determination and without requiring the complication of delay and damping devices for smoothing jolt effects.

Briefly, the actual jolt effect ($R_{ist}$) is continuously detected and compared with a maximum permissible value ($R_S$) by comparing two corresponding electrical signals, and the difference between these two signals is supplied to a control stage that produces a signal corresponding to a first control magnitude having a range of values that can be varied by the difference signal generated by comparing the current motor speed ($n_M$) and a predetermined speed ($n_K$), and a second control magnitude is formed by the time rate of change of the motor speed ($n_M$) which is added to the first control magnitude to produce a sum signal that is applied to the control member of a friction clutch between motor and transmission.

Preferably, the regulation stage operates by calculating the angle ($\beta$) which is formed by the relative progress (time-slope) of the motor speed ($n_M$) and of the transmission input speed ($n_G$) and this angle is then compared with a maximum permissible value ($\beta_s$) to provide a difference signal which, as the first control magnitude, is added to the second control magnitude whenever the difference between the motor speed ($n_M$) and the transmission input speed ($n_G$) falls below a predetermined value ($\Delta n$).

Preferably, also, the actual jolt ($R_{ist}$) at any moment is determined by twice differentiating the transmission input speed ($n_G$). It is also preferred for the first control magnitude to be set at the value "1" whenever the transmission input speed ($n_G$) lies below a predetermined value ($n_{GO}$). Furthermore, preferably the signs of the first control magnitude, of the second control magnitude and of the maximum permissible angle above mentioned ($\beta_S$) are reversed when the motor speed ($n_M$), instead of being greater than the transmission input speed ($n_G$) is smaller than the latter.

It is finally preferable that whenever the transmission input speed ($n_G$) is greater than the abovementioned predetermined speed ($n_K$), the range of the first control value is modified by the difference between motor speed ($n_M$) and transmission input speed ($n_G$).

The invention has the advantages that it is possible to control the gear shifting jolt in correspondence with the phases of motor and transmission speed conditions that occur during starting and gear shifting in a motor vehicle. For this purpose, it is necessary to determine merely the parameters motor speed and transmission input speed and then, by the provision beforehand of a few criterion values determining the magnitude of the transmission jolt to be expected, a rapid and at the same time smooth closing of the friction clutch members can be obtained both upon starting up and also in shifting gears of the motor vehicle. By the benefit of the invention, it is furthermore possible to constitute an automated clutching operation in such a way that a certain maximum permissible jolt is not exceeded and the control involved therein can also serve for fulfilling known concepts for automatic shifting of a stepwise transmission. This has the advantage that, for example, in the case of converter-type automatic shifts, the jolt value can be controlled and limited with purely electronic means and the array of damping devices that are necessary by the now conventional hydraulic transmission controls can be dispensed with. The input signal values required for clutching control according to the present invention, namely motor speed and transmission input speed, are already today utilized for determining the proper time for shifting between gears in an automatic transmission, so that no additional tachogenerators or similar transducers are necessary for providing the original input magnitudes for the present invention. The additional expense of incorporating the present invention is accordingly limited to purely electronic components and subassemblies. In contrast to the known hydraulic devices and techniques, the method and apparatus of the present invention is independent of the temperature, which in the case of purely hydraulic or electrohydraulic handling of the jolt problem, produces variations adversely affecting the comfort of the vehicle occupants. In view of the so-called integrated electronic components now widely available in considerable variety at low cost, the necessary cost for incorporating the advantages of the present invention into an automatic transmission control system is to be estimated as relatively small.

DRAWINGS, ILLUSTRATING EXAMPLES

The invention is further described by way of illustrative examples with reference to the accompanying drawings, in which.

PRINCIPLES AND METHOD OF THE INVENTION

A friction clutch is usually provided having a control member actuating the friction elements (plates) for their engagement or disengagement, for coupling driving and driven elements in motor vehicles equipped with automatic or semiautomatic stepwise transmissions. It is intended to limit the gear shifting jolt to a permissible value in these cases by means of suitable hydraulic positioning of the clutch elements through their control member. The present invention shows how with the help of means that are preferably electronic, friction elements or, quite generally, slip-engaged force transmission members could be so controlled that, on the one hand, clutching can be done as rapidly as possible in order to reduce wear on the coupling elements and, on the other hand, can be effected in a way that no disturbing shifting jolt occurs. For understanding the invention, the starting point is the concept of a certain still tolerable, maximum permissible value of the shifting jolt $R_s$. This value of jolt $R_s$ can be made dependent upon driving conditions, e.g. a driver operating a vehicle in a rally or under other sport conditions, would expect to set the maximum permissible shifting jolt at a relatively high value, comparable to other driving jolts in such driving. Furthermore, it is easily seen that the maximum permissible shifting jolt $R_s$ depends, for example, upon the engine loading condition (throttle position, intake vacuum, amount of air sucked in) and/or upon the selected gear and, as such, can be expressed as a function of these magnitudes.

Figure 1:
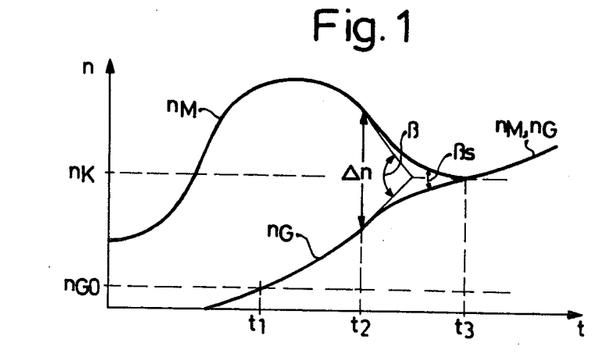
FIG. 1 is a graph showing the time-course of motor and transmission input speeds in operation of the present invention for gear shift jolt control during engagement of the clutch at a predetermined speed.

The problem solved by the invention is to provide for control of the amount of shifting jolt by taking account essentially of engine speed and transmission input speed. FIG. 1 shows the time-course of these two speeds for a starting-up process. At the outset, the motor is running and starts speeding up while the transmission input speed $n_G$ is zero, because no force is yet being transmitted through the friction elements of the clutch. As soon as force is transmitted from the driving to the driven side, the transmission input speed $n_G$ rises. Since the jolt control in this illustrative example of the method of the present invention is designed to operate exclusively in terms of the motor speed $n_M$ and the transmission input speed $n_G$, the jolt affecting the vehicle at any particular time can be determined only by twice differentiating the transmission input speed $n_G$. This is possible, however, only if the transmission input speed $n_G$ has come to exceed a certain threshold value $n_{GO}$. This is the case at the moment $t_1$. Up to the moment $t_1$, therefore, no regulation of the jolt force, but only a control of the clutch engagement is possible. From the moment $t_1$ on, the control member for positioning the friction elements of the clutch is actuated in such a manner that the actual jolt effect on the vehicle is compared with the maximum permissible jolt force $R_s$ and the difference is applied to the clutch control member. In order to prevent the clutching operation from terminating at too high a speed of rotation, this difference signal is modified by the difference between the motor speed $n_M$ and a predetermined speed $n_K$.

Control in accordance with the difference jolt value is continued after the moment $t_1$ until the difference between the motor speed $n_M$ and the transmission input speed $n_G$ has been reduced to a predetermined value $\Delta n$. This is the case in FIG. 1 at the moment $t_2$. From this moment on, the control is so continued that the respective time-courses of the motor speed $n_M$ and of the transmission input speed $n_G$ run together (in terms of the slopes of these curves, as shown in FIG. 1) at an angle $\beta$ that is smaller than a predetermined maximum permissible angle $\beta_s$. If, for example, at the moment $t_2$ the angle, which the slopes of these two time curves form with each other, is $\beta_1$ and $\beta_1$ is greater than $\beta_s$, the clutch plates are so controlled that the angle at which the slopes of these two curves meet will be reduced. The friction plates of the clutch are finally completely engaged at the moment $t_3$, after which the motor speed $n_M$ is equal to the transmission input speed $n_G$. By modifying the clutching process with reference to a predetermined speed $n_K$, the result is thus produced that the clutching operation is completed at the moment $t_3$ at the prescribed motor speed $n_K$.

Figure 2:
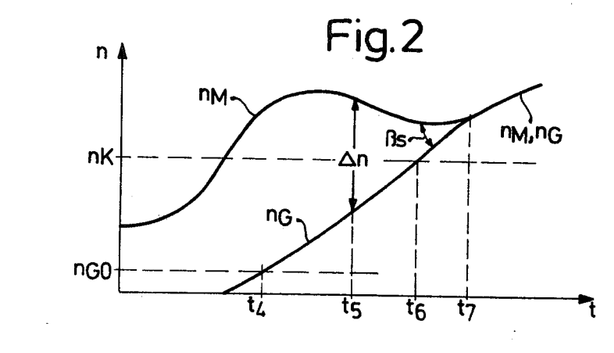
FIG. 2 is a graph of the time-course of motor and transmission input speeds during operation of the present invention in a case in which the transmission input speed has exceeded a predetermined speed.

FIG. 2 shows the course of motor speeds $n_M$ and transmission input speed $n_G$ for the case in which the transmission input speed $n_G$ gets above the prescribed speed $n_K$ before the completion of clutching. Up to the moment $t_4$ in the diagram of FIG. 2, the clutch control member is controlled as already described. From $t_4$ to $t_5$, it is controlled with reference to jolt effect difference and from $t_5$ on, this jolt effect difference control is overlaid with angular control with reference to the angle $\beta$ already described. As already stated, the range of the control signal corresponding to jolt effect difference is modified by the difference between the motor speed $n_M$ and the prescribed speed $n_K$ in order to avoid clutching at too great a shaft speed. If, nevertheless, the transmission input speed $n_G$ exceeds the prescribed speed $n_K$, the jolt difference control signal must be limited by the difference between the motor speed $n_M$ and the transmission input speed $n_G$. This is the case from the moment $t_6$ until the moment $t_7$ when the clutch is fully engaged.

Figure 3:
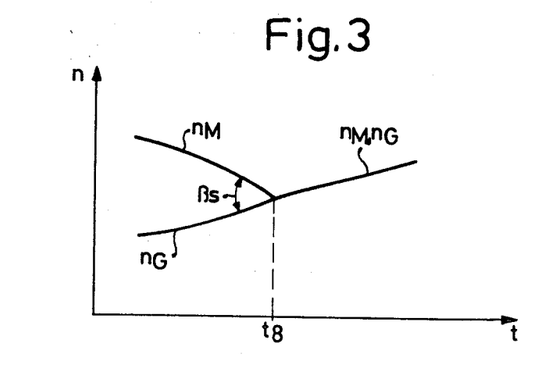
FIG. 3 is a graph showing the time-course of motor and transmission input speed in operation of the present invention during upshifting.

FIG. 3 shows the time-courses of the motor speed $n_M$ and of the transmission input speed $n_G$ for the case of clutching after upshifting. Here also the control is carried out in the manner explained with reference to FIGS. 1 and 2, but the difference between the motor speed $n_M$ and the transmission input speed $n_G$ is, nevertheless, smaller as a rule than the predetermined speed difference $\Delta n$, so that the control operation in clutching after a shift of gears in general involves jolt difference signal control with overlaid time slope difference angle control.

Figure 4:
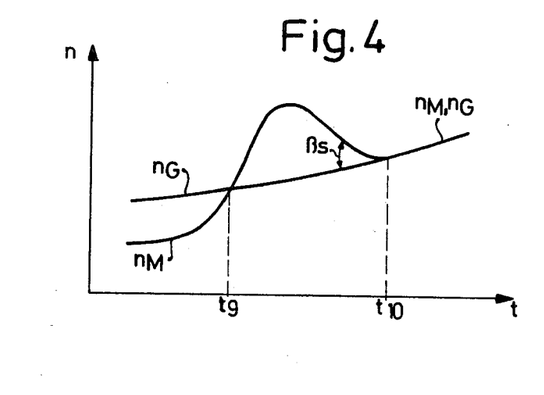
FIG. 4 is a graph of the time-course of motor and transmission input speeds in operation of the present invention in the case of downshifting.

FIG. 4 shows the time-courses of motor speed and transmission input speed for a clutching operation after downshifting. In downshifting, the motor speed $n_M$ is at first smaller than the transmission input speed $n_G$, but rises and crosses the latter at the moment $t_9$ in order to approach the transmission input speed subsequently from above, until clutching is completed at the moment $t_{10}$. In this case also, the control in general is produced by superimposed jolt effect difference and time slope difference angle, but a precaution must be observed that the difference between motor speed $n_M$ and transmission input speed $n_G$ and, likewise, the time slope difference angle, can also assume negative values.

DESCRIPTION OF CIRCUIT DIAGRAMS

Figure 5:
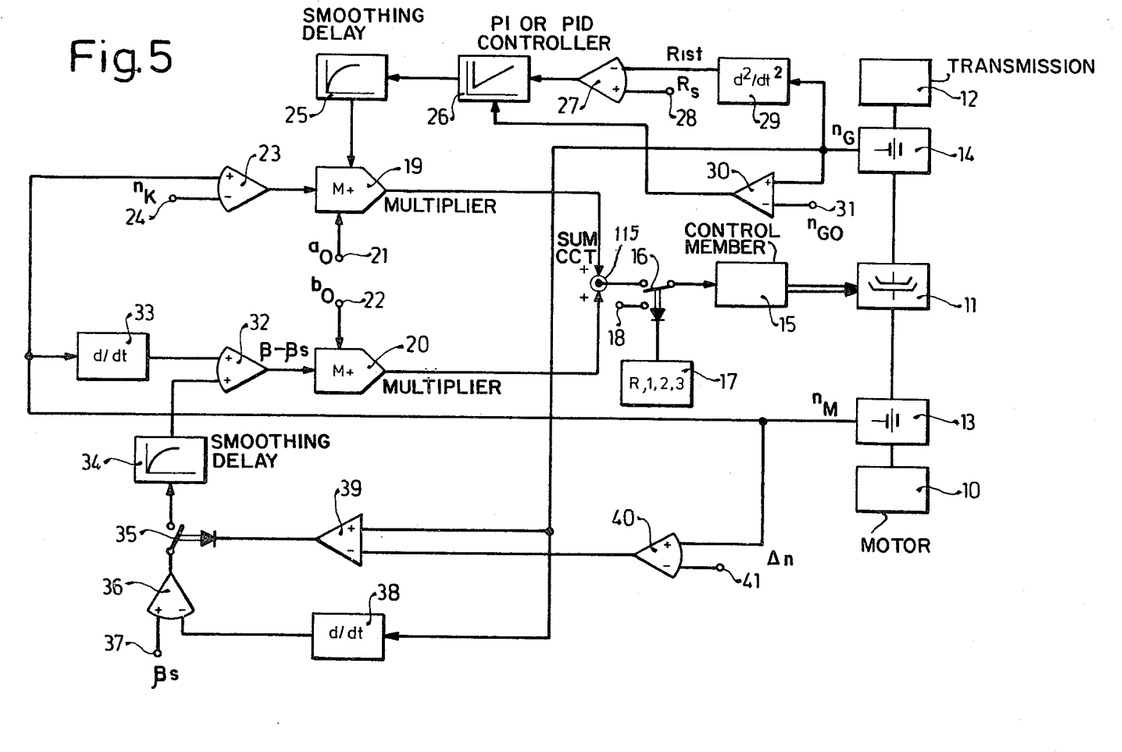
FIG. 5 is a basic circuit diagram of a first embodiment of apparatus according to the invention for carrying out process of the invention illustrated in the graphs.

FIG. 5 is the basic circuit diagram, largely in block form, of an embodiment of a first kind of apparatus for carrying out the control methods described above with reference to FIGS. 1-4. An internal combustion engine 10 is connected to a vehicle transmission 12 through a clutch 11. Although the clutch may, as a matter of construction, be built as part of the transmission in the case of an automatic transmission, it is convenient to refer to the clutch as being between the motor 10 and the transmission 12. On the shaft on the motor side of the clutch 11 is a motor speed transducer 13 and on the shaft on the transmission side, a transmission input speed transducer 14. The friction plates of the clutch 11 are positioned by a control member 15, here illustrated as electrically driven and having an electrical input that can be connected either through a switch 16 with a calculation circuit or with a first terminal 18. The first switch 16 is actuated by a switch lever 17 of a semiautomatic stepwise transmission. The first switch 16, the switch lever 17 and the first terminal 18 are present only if the motor vehicle has a semiautomatic transmission (normal gear shift transmission, but without clutch pedal). If the motor vehicle is equipped with a fully automatic transmission (with selection of automatic gear shift range), the input of the control member 15 is directly connected to the computation circuit now to be described and the components 16, 17 and 18 are omitted. The input of the control member 15 is connected through an additive superposition circuit 115 with both the respective outputs of a first multiplier stage 19 and a second multiplier stage 20, these multiplier stages respectively having terminals 21 and 22 for providing one input to the particular multiplier. The multiplier stage 19 has another input that is connected with the output of a first summing stage 23, that in turn has an inverting input connected to a fourth terminal 24 and a non-inverting input conected to the output of the motor speed transducer 13. Still another input of the first multiplier stage 19 is connected through a first delay circuit 25 with a controller stage 26 that is driven by an input provided by a second summing stage 27. The non-inverting input of the second summing stage 27 is taken from a seventh terminal 28 and the inverting input of this stage is connected to a double-differentiating stage 29 of which the input is connected to the transmission input speed transducer 14.

The controller stage 26 further has a setting input to which the output of a first comparator 30 is connected that has its non-inverting input conected with the transmission input speed transducer 14 and its inverting input taken from a fifth terminal 31. The controller 26 may be a two-term proportional-differential or three-term proportional-integral differential controller and its effect, either alone or together with that of the first delay stage 25, may accordingly be represented in a general way by a transfer function $F_{(j\omega)}$.

Another input of the second multiplier stage 20 is connected to the output of a third summing stage 32 that has a non-inverting input connected through a first differentiating stage 33 to the motor speed transducer 13. The second input of the third summing stage 32 is connected through a second delay circuit 34 and through a second switch 35, constituted as a normally closed interruptor, with the output of a fourth summing stage 36. The non-inverting input of the fourth summing stage 36 is taken from a sixth terminal 37 and the inverting input of that stage is connected through a second differentiating stage 38 to the transmission input speed transducer 14. The control input of the second switch 35 is connected to the output of a second comparator 39 that has a non-inverting input connected to the transmission input transducer 14 and an inverting input connected to the output of a fifth summing stage 40. The non-inverting input of the fifth summing stage 40 is connected to the motor speed transducer 13 and the inverting input of this same stage is taken from an eighth terminal 41.

Operation of the Circuit

The control member 15 has a control magnitude applied to it that is composed of the sum of the outputs of the first multiplier stage 19 and of the second multiplier stage 20. Only in the case of motor vehicles with semiautomatic stepwise transmissions is the first switch 16 switched over by the control lever 17, so that at the input of the control member 15 a voltage $U_a$ appearing at the first terminal 18 is briefly applied to the control member 15 to disengage the clutch plates. For the actual shifting operation and clutching into the new gear with regard to reducing the jolt, the switch 16 is of course returned into its original position. With the second switch 35 opened, the output voltage of the second multiplier stage 20 corresponds to the first time derivative of the motor speed $n_M$ which is normalized by the control voltage $b_0$ applied to the third terminal 22 that operates as a normalizing factor. In the similar way the output voltage of the first multiplier 19 is normalized by a voltage $a_0$ applied to the second terminal 21. The first multiplier stage 19 also responds to the output voltage of the first summing stage 23 which results from the difference between the motor speed $n_M$ and the prescribed reference $n_K$ that is represented by a voltage applied to the fourth terminal 24. The first multiplier stage 19 is also supplied with the output voltage of the controller stage 26 through the first delay circuit 25. The multiplication it performs may be regarded as amplitude modulation of the delayed controller output by a signal proportional to the difference between motor speed and a reference speed value. The controller stage 26 has a setting input that is connected with the first comparator 30 and can be set to the output value "1". The first comparator 30 is supplied with the transmission input speed $n_G$ and also, through the fifth terminal 31, the prescribed lower threshold of transmission input speed $n_{G0}$, both in the form of voltages. If $n_G$ is smaller than $n_{G0}$, the output of the controller stage 26 is set at the value "1". This corresponds to the region to the left of the instant $t_1$ in FIG. 1.

In the second summing stage 27, the difference between the actual jolt effect $R_{ist}$ and the maximum permissible jolt effect $R_s$ is produced. The actual jolt effect is supplied as a voltage to the inverting input of the second summing stage, in the illustrated example shown in FIG. 5, formed by the double-differentiating stage 29 that produces the second derivative of the transmission input speed $n_G$. There are of course also other possibilities, in which the actual jolt effect $R_{ist}$ is formed of other parameters, for example the vehicle speed or the vehicle acceleration.

The maximum permissible jolt effect $R_s$, which can be provided by predetermined values and engine condition parameters as above described, is in this case provided as a voltage at the seventh terminal 28 in a manner not shown in this particular diagram.

As soon as the transmission input speed $n_G$ oversteps the threshold $n_{G0}$, and at the same time the output of the controller stage 26 is, accordingly, released from the set value "1", the jolt effect difference represented by the output of the second summing stage 27 is supplied through the controller stage 26 that has a transfer function $F_{(j\omega)}$ and through the delay circuit 25 that provides a smoothing of the shifting operation, to the first multiplier stage 29. This condition corresponds to the region of FIG. 1 between the instants $t_1$ and $t_2$. The delay circuits 25 and 34, as indicated by the graph-like symbol applied to them in the drawing, provides smoothing by reducing the steepness of transients in the course of the signal voltage, and may be regarded as delaying higher frequency components for that purpose.

The second multiplier stage 20 is supplied with the positioning signal serving for slope difference angle control with the switch 35, the second delay circuit 34 and the third summing stage 32. The difference between the angle $\beta$ at the particular instant and a prescribed maximum permissible angle $\beta_s$ is produced in a fourth summing stage 36. The value $\beta_s$ is obtained as a voltage from the sixth terminal 37. The value $\beta$ is produced by the second differentiating stage 38 operating on the transmisssion input speed $n_G$ and is furnished by the stage 38 to the inverting input of the fourth summing stage 36. The angle control signals, as above described, is intended to be superimposed only if the difference between the motor speed $n_M$ and the transmission input speed $n_G$ has gone below a predetermined value $\Delta n$. For this reason, the second switch 35 is actuated by the second comparator 39. The predetermined difference speed $\Delta n$ is supplied as a voltage from the eighth terminal 41 to the inverting input of the fifth summing stage 40, which has at its non-inverting input a signal corresponding to the motor speed $n_M$. The difference between these two signals, represented by the output signal of the fifth summing stage 40, is supplied to the inverting input of the second comparator 39, which has its non-inverting input connected to a signal corresponding to the transmission input speed $n_G$. If now the difference between the motor speed $n_M$ and the transmission input speed $n_G$ becomes lower than the difference speed $\Delta n$, the second comparator 39 switches into the "0" condition and the second switch 35 is closed. This corresponds in FIG. 1 to the portion of the curve from the moment $t_2$ onwards.

The basic circuit diagram shown in FIG. 5 constitutes an embodiment of an apparatus for carrying out the method of the invention with a three-step control and regulation program determined by the first comparator 30 and the second comparator 39. If the transmission input speed $n_G$ is smaller than $n_{G0}$, the first comparator 30 sets the output of the regulation stage 26 at "1" and there is provided at the input of the control member 15 a positioning magnitude according to the relation:

$$U_{s1} = a_o(n_M - n_K) + b_o \dot{n}_M$$

As soon as the transmission input speed $n_G$ exceeds the value $n_{G0}$, the output of the regulation stage 26 is set free and there is then present at the input for the control member 15 the following positioning magnitude:

$$U_{s2} = a_o F_{(j\omega)}(R_s - R_{ist})(n_M - n_K) + b_o \dot{n}_M$$

Finally, when the motor speed $n_M$ and the transmission input speed $n_G$ have approached each other so closely that their difference has become smaller than $\Delta n$, the second comparator 39 closes the second switch 35 and there is accordingly provided to the electrical input of the control member 15 a control magnitude according to the relation:

$$U_{s3} = a_o F_{(j\omega)}(R_s - R_{ist})(n_M - n_K) + b_o(\dot{n}_M - \dot{n}_G + \beta_s)$$

Figure 6:
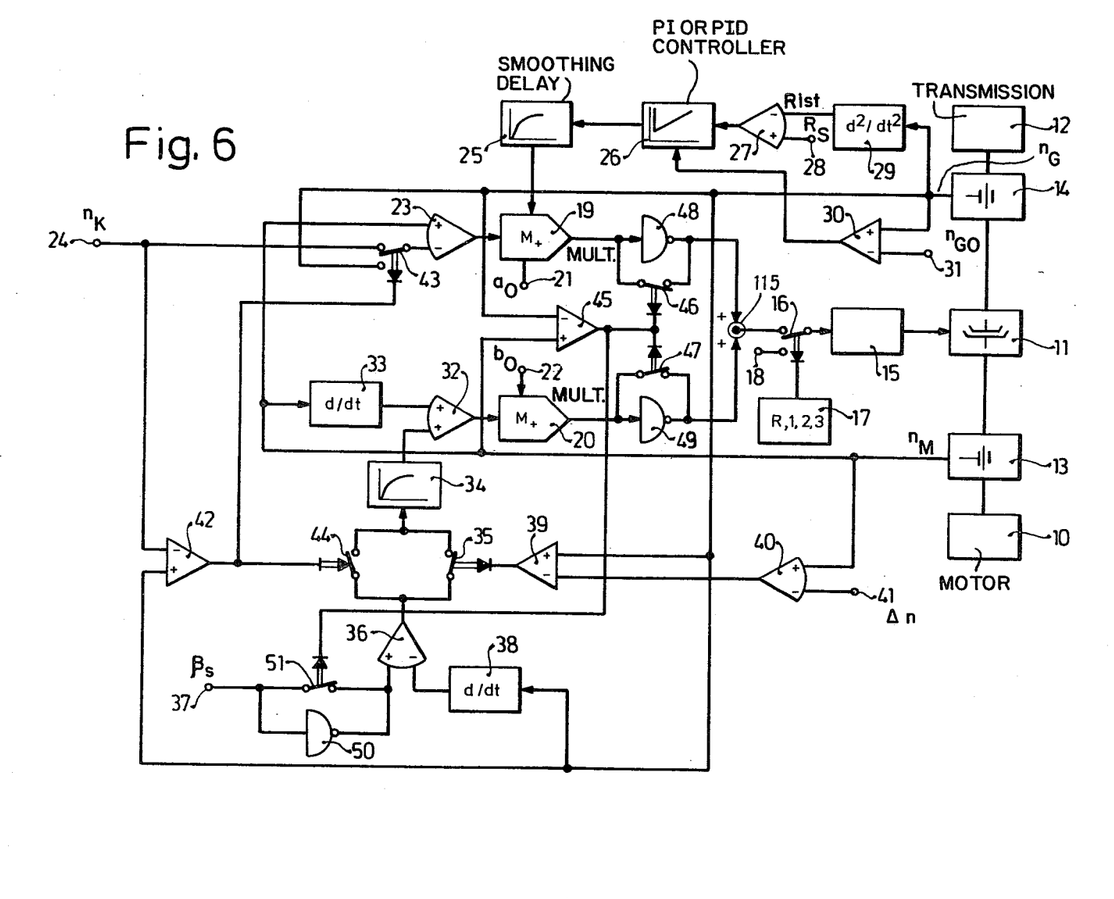
FIG. 6 is a basic circuit diagram of a second embodiment of an apparatus according to the invention for carrying out the graphically illustrated process examples.

FIG. 6 shows the basic circuit diagram of a second embodiment of an apparatus for carrying out the method of the present invention. In this circuit, a third comparator 42 has its inverting input connected to the fourth terminal 24 and has its non-inverting input connected to the transmission input speed transducer 14. The output of the third comparator 42 is connected with the control input of a third switch 43 that is constituted as a transfer switch by which the inverting input of the first summing stage 23 can be transferred from the fourth terminal 24 to the transmission input speed transducer 14 and vice versa. The output of the third comparator 42 is also connected with the control input of a normally open fourth switch 44 which has its contacts bridging those of the second switch 35. A fourth comparator 45 has its inverting input connected to the transmission input speed transducer 14 and its non-inverting input connected to the motor speed transducer 13. The output of the fourth comparator 45 is connected with the control inputs of a normally closed fifth switch 46 and a normally closed sixth switch 47. The fifth switch 46 is interposed in the connection between the first multiplier stage 19 and the control member 15, while the sixth switch 47 is interposed in the connection between the output of the second multiplier stage 20 and the control member 15. The contacts of the fifth switch 46 are bridged by an inverter stage 48 and the contacts of the sixth switch 47 are likewise bridged by a second inverter stage 49. The output of the fourth comparator 45 is, furthermore, connected to the control input of a normally closed seventh switch 51 that is interposed in the connection between the sixth terminal 37 and the non-inverting input of the fourth summing stage 36. The contacts of the seventh switch 51 are bridged by a third inverter stage 50.

References to "normally open" and "normally closed" switches follow conventional terminology designating by "normally" the state of the switch in the quiescent or rest state of the equipment. This terminology, which originated as a designation of an electromagnetic relay by reference to its state when its winding is not energized, has been extended to other electrically controlled switches such as semiconductor switches and must not be taken as referring to whatever may be more "normal" in an operational sense when the equipment is energized and operating. The opposite to the "normal" state of a switch in this terminology is referred to as the "operated" state.

Operation of the Circuit of FIG. 6.

The third comparator 42 switches when the transmission input speed $n_G$ supplied to its non-inverting input rises above the prescribed speed $n_K$ supplied as a signal to its inverting input. Then the control of the jolt effect is no longer influenced in its range by the difference between motor speed and prescribed speed ($n_M - n_K$), but rather by the difference between motor speed and the transmission input speed ($n_M - n_G$). For this purpose, the inverting input of the first summing stage 23 is switched over from the connection supplying the signal $n_K$ to the connection carrying the signal $n_G$, by means of the third switch 43. This phase of the control regulation corresponds in FIG. 2 to the area to the right of the moment $t_6$. At the same time, the closing of the fourth switch 44 bridges the contacts of the second switch 35. In consequence, the slope difference angle regulation is also superimposed on the control signal if the motor speed $n_M$ and the transmission input speed $n_G$ have not yet approached each other by as much as the predetermined value, $\Delta n$, but the transmission input speed $n_G$ has nevertheless gone above the prescribed speed $n_K$.

The fourth comparator 45 will switch over if the motor speed $n_M$ is smaller than the transmission speed $n_G$. Then the fifth switch 46 and the sixth switch 47 will be operated (open) and the output signal of the first multiplier stage 19 and of the second multiplier stage 20 will have their signs reversed before application of these output signals to the control member 15. Furthermore, as a result of the opening of the seventh switch 51, the sign of the predetermined maximum permissible angle $\beta_s$ will be reversed at the non-inverting input of the fourth summing stage 36. This corresponds to the speed curves shown in FIG. 4 to the left of the moment $t_9$.

By the further development illustrated in FIG. 6 of the basic circuit diagram given in FIG. 5, the cases are taken care of in which the transmission input speed $n_G$ goes below the prescribed speed $n_K$ and/or in which the motor speed $n_M$ is smaller than the transmission input speed $n_G$. The switching-over operation, upon occurrence of one of these two criteria, is produced by the third comparator 42 in one case and by the fourth comparator 45 in the other. If for example the transmission input speed $n_G$ is greater than the prescribed speed $n_K$, corresponding to the region between the moments $t_6$ and $t_7$ in FIG. 2, the third comparator 42 switches the third switch 43 and the fourth switch 44 and a positioning magnitude is provided at the input of the control member 15 that can be represented by the relation:

$$U_{s4} = a_o F_{(j\omega)}(R_s - R_{ist})(n_M - n_G) + b_o(\dot{n}_M - \dot{n}_G + \beta_s)$$

If in the case of down-switching corresponding to the speed curve given in FIG. 4, the motor speed $n_M$ is smaller than the transmission input speed $n_G$, the fourth comparator 45 switches over the fifth switch 46, the sixth switch 47 and the seventh switch 51, and—so long as the transmission input speed $n_G$ is smaller than the prescribed speed $n_K$—the resulting signal supplied to the input of the control member 15 is a positioning signal according to the relation:

$$U_{s5} = -a_o F_{(j\omega)}(R_s - R_{ist})(n_M - n_K) - b_o(\dot{n}_M - \dot{n}_G - \beta_s)$$

In down-shifting, the motor speed $n_M$ is usually smaller than the transmission input speed $n_G$. In this shifting condition, however, the transmission input speed $n_G$ is very much greater than the prescribed speed $n_K$. There is then provided to the input of the control member a positioning signal according to the relation:

$$U_{s6} = -a_o(F_{(j\omega)}(R_s - R_{ist})(n_M - n_G) - b_o(\dot{n}_M - \dot{n}_G - \beta_s)$$

The switchover operations above outlined between the individual regulation phases produced by the comparators 30, 39, 42 and 45 are independent from each other and can take place and switch over in different combinations according to the driving condition of the vehicle.

Although the invention has been described with reference to particular illustrative embodiments, it will be understood that variations and modifications are possible within the inventive concept.

We claim:

1. A method of eliminating gear shifting jolt in motor vehicles equipped with automatic or semiautomatic stepwise-variable transmissions and having a friction clutch controlled by a control member for coupling power between driving and driven portions of the propulsion machinery, which method comprises the steps of:

setting a maximum permissible value of gear shifting jolt ($R_S$) and producing a first electrical signal corresponding to said maximum permissible jolt value;

generating second ($n_M$) and third ($n_G$) electrical signals respectively corresponding in magnitude to motor speed and transmission input speed;

generating a fourth electrical signal corresponding to the value of detected actual jolt ($R_{ist}$), in response to at least said third signal;

generating a fifth electrical signal corresponding to the difference between detected actual jolt and maximum permissible jolt by subtracting said fourth signal from said first signal;

generating in response to said fifth signal and to a sixth electrical signal by means of a controller stage 26 having a transfer function $F_{(j\omega)}$ composed of at least a proportional and a differential term to which controller said fifth electrical signal is supplied as an input;

modulating the amplitude of said sixth signal by a seventh electrical signal corresponding to the difference between motor speed ($n_M$) and a predetermined speed ($n_K$) in a multiplier stage to produce an eighth electrical signal;

generating a ninth electrical signal in response to at least the time rate of change of said second electrical signal;

generating a tenth electrical signal by summing said eighth and ninth electricals, and applying said tenth electrical signal to said control member of said friction clutch.

2. A method as defined in claim 1 in which in the step of generating said sixth signal, during any time in which said third signal ($n_G$) has a value greater than a value corresponding to said predetermined speed ($n_K$), the amplitude of said sixth signal, instead of being modulated by said seventh signal, is modulated by a fifteenth signal representative of the difference between motor speed ($n_M$) and transmission input speed ($n_G$) and obtained by subtractively combining said second and third signals.

3. A method as defined in claim 1 which is the step of generating said fourth electrical signal is performed in response to said third signal ($n_G$) by differentiating that third signal twice in succession to provide said fourth signal as a signal representative of the second derivative of the transmission input speed.

4. A method as defined in claim 3 in which in the step of generating said sixth electrical signal, said sixth electrical signal appearing at the output of said controller stage (26) is caused to have the value "1" whenever said third signal ($n_G$) is less than a predetermined value ($n_{G0}$) of said third signal.

5. A method as defined in claim 1 in which the step of generating said ninth electrical signal comprises the substeps of:
   differentiating said second and third signals to obtain eleventh and twelfth electrical signals respectively representative of the time rate of change of motor speed and of transmission input speed;
   generating said ninth signal by adding together one of said eleventh and twelfth signals, the inverse of the other of them, and a signal representative of a maximum permissible value ($\beta_S$) of the angle between the slopes at which the time courses of said second and third signals approach each other, said ninth signal thereby being made a representative of the difference between the angle ($\beta$) between said slopes and said maximum permissible value ($\beta_S$) of said angle;
   comparing the difference between said second ($n_M$) and third ($n_G$) signals and a constant electrical signal representative of a predetermined speed difference ($\Delta_n$) to form therefrom a fourteenth electrical signal indicative of whether the difference between motor speed and transmission input speed is less than said predetermined speed difference, and
   eliminating the contribution of said twelfth and thirteenth signals to the formation of said ninth signal, so that said ninth signal becomes essentially the same as said eleventh signal, whenever said fourteenth electrical signal indicates that the difference between motor speed and transmission input speed is less than said predetermined difference.

6. A method as defined in claim 5 in which in the step of generating said tenth signal, the sign of said eighth signal, said ninth signal and of said thirteenth signal is reversed when said second signal ($n_M$) is smaller than said third signal ($n_G$), indicating that the motor speed is smaller than the transmission input speed.

7. A method as defined in claim 5, in which the step of modulating the amplitude of said sixth signal by a seventh electrical signal is performed by multiplying these signals together with further application of a third multiplying factor in the form of an electrical signal of constant value as a normalizing factor, and in which, further, the step of generating said thirteenth electrical signal by summing said eleventh and twelfth signals also includes the operation of multiplying the sum of said seventh and twelfth signals by a constant electrical signal of a magnitude such as to provide a normalizing factor.

8. Apparatus for mitigating gear-engagement jolts in a motor vehicle equipped with an automatic or a semi-automatic stepwise-variable transmission and having a clutch, controlled by a control member thereof, for coupling power between a motor and said transmission, which apparatus, for control of said control member, comprises:
   a motor speed transducer (13) for generating a first electrical signal representative of motor speed ($n_M$);
   a transmission input speed transducer (14) for generating a second electrical signal representative of transmission speed ($n_G$);
   means for generating a third electrical signal representative of the maximum permissible jolt magnitude ($R_s$);
   means for generating a fourth electrical signal representative of the actual jolt magnitude, as instantaneously observable, exerted in the vehicle ($R_{ist}$);
   means (24) for supplying a fifth electrical signal representative of a predetermined motor speed ($n_K$);
   first signal subtracting means (23) having said first and said fifth signals as inputs for producing a sixth electrical signal representative of the difference ($n_M - n_K$) between said fifth and first signals;
   second signal subtracting means (27) having said third and fourth signals as inputs for producing a seventh electrical signal representative of the difference ($R_s - R_{ist}$) between said fourth and third signals;
   controller means (26) having a control input to which the output of said second subtracting means (27) is connected and having a frequency-dependent transfer characteristic $F_{(j\omega)}$ for producing an eighth electrical signal;
   first multiplier means (19) for multiplying the output signal of said controller means (26) by the output signal of said first subtracting means (23) and by a normalizing factor $a_0$ to produce a ninth electrical signal $a_0 F_{(j\omega)} (R_s - R_{ist}) (n_M - n_k)$;
   first differentiating means (33) connected to the output of said motor speed transducer (13) for producing a tenth electrical signal ($\dot{n}_M$);
   second multiplier means (20) for multiplying the output signal of said first differentiating means (33) by a second normalizing factor $b_0$, and
   means (115,15) for adding the output signals of said first and second multiplier means and displacing said control member of said clutch (11) in response to the signal resulting from so superimposing said output signals.

9. An apparatus as defined in claim 8, in which means (25) for smoothing steep transients in the output of said controller means (26) by delaying high-frequency components thereof are interposed between the output of said controller means and an input of said first multiplier means (19).

10. An apparatus as defined in claim 8, in which said means (115,15) for adding the output signals of said first and second multiplier means and displacing said control member of said clutch (11) in response to the signal resulting from so adding said output signals also comprises a second transfer switch (16) for disconnecting the portion of said means for displacing said control member from the portion of said means for adding the output signals of said first and second multiplier means and transferring the input of said portion of said means for displacing said control member to an electrical contact supplied with a predetermined voltage, and second transfer switch (16) being controlled by the displacement of a semiautomatic transmission gear shift lever (17).

11. An apparatus as defined in claim 8, in which a first comparator means (30) is provided having one input connected to said transmission input speed transducer (14) and its other input connected to a source of potential of the value representative of a predetermined lower threshold transmission input speed ($n_{GO}$), and in which the output of said first comparator means (30) is so connected to said controller (26) as to set the output of said controller to a predetermined value (1) when the signal produced by said transmission input transducer is less than said potential representative of a predetermined threshold speed.

12. An apparatus as defined in claim 11 in which there is interposed between the output of said first differentiating means (33) and an input of said second multiplier means (20) a summing means (32) for adding an additional signal to the output of said first differentiating means (33), as presented to the input of said second multiplier means (20), and in which there are also provided second differentiating means (38) for differentiating the output of said transmission input transducer (14) and also third subtracting means (36) for producing a signal representative of the sign inverted difference between a predetermined signal magnitude and the output of said second differentiating means (38), and in which also a first switch (35) is interposed between the output of said third subtracting means (36) and the additional signal input of said interposed summing means (32), and in which further, second comparator means (39, 40) are provided for closing said first switch (35) when the difference between motor speed ($n_M$) and transmission input speed ($n_G$) falls below a predetermined speed difference value ($\Delta_n$).

13. An apparatus as defined in claim 12, in which there are interposed between the respective outputs of said first (19) and said second (20) multiplier means and said adding means (115) second and third switches (46,47) of which the contacts are respectively bridged by first and second inverters (48,49), for simultaneously converting the outputs of said multiplier means when said switches are operated, in which, further, third comparator means (45) are provided for producing a signal for operating said switches when the output of said motor speed transducer (13) is greater than the output of said transmission input transducer (14), and in which, further, there is also interposed between that input of said third subtracting means (36) and the source of said predetermined voltage a fourth switch (51) of which the contacts are bridged by a third inverter (50), and fourth switch (51) as well as said second and third switches (46,47) being arranged to be operated by said third comparator means (45).

14. An apparatus as defined in claim 13, in which there is interposed between said means (24) for supplying said fifth signal and said first signal subtracting means (23) a pair of contacts of a first transfer switch (43) arranged for transferring, when operated, a corresponding input of said first subtracting means (23) from said means (24) for supplying an electrical signal representative of a predetermined motor speed ($n_K$) to the output of said transmission input speed transducer (14) and the control circuit of said first transfer switch (43) is arranged to be operated by a fourth comparator means (42) when the output of said transmission input speed transducer (14) exceeds said fifth electrical signal, said fourth comparator means (42) being also arranged to operate a fifth switch (44) having its contacts bridged across the contacts of said first switch (35).

15. An apparatus as defined in claim 11, in which a first delay circuit (25) for smoothing output transients of said controller means (26) is interposed between the output of said controller means and the corresponding input of said first multiplier means (19).

16. An apparatus as defined in claim 15 in which a second delay circuit (34) is interposed between said first switch (35) and said additional signal input of said summing means (32).

* * * * *